United States Patent [19]

Opavsky et al.

[11] 3,993,559

[45] Nov. 23, 1976

[54] PROCESS FOR ELIMINATING REACTIVE CHLORINATED ORGANIC COMPOUNDS FROM AQUEOUS SOLUTIONS

[75] Inventors: Werner Opavsky; Elvira Macpherson, both of Cologne, Germany

[73] Assignee: Wacker-Chemie GmbH, Munich, Germany

[22] Filed: May 14, 1975

[21] Appl. No.: 577,251

[30] Foreign Application Priority Data

June 24, 1974 Germany............................ 2430193

[52] U.S. Cl..................................... 210/54; 210/56
[51] Int. Cl.²......................................... B01D 21/01
[58] Field of Search............. 210/18, 42, 44, 49–54, 210/56, 59, 62, 63; 260/648 R, 654 S, 658 C

[56] References Cited
UNITED STATES PATENTS

| | | | |
|---|---|---|---|
| 1,892,972 | 1/1933 | Urbain.................................. | 210/54 |
| 2,480,266 | 8/1949 | Schmenling...................... | 260/648 R |
| 3,235,491 | 2/1966 | Rosenberg et al..................... | 210/53 |
| 3,647,895 | 3/1972 | Fruhwirth et al................ | 260/654 S |
| 3,933,633 | 1/1976 | Saitoh et al............................ | 210/44 |

Primary Examiner—Thomas G. Wyse
Assistant Examiner—Peter A. Hruskoci
Attorney, Agent, or Firm—Allison C. Collard

[57] ABSTRACT

Process for eliminating reactive chlorinated organic compounds from aqueous solutions, especially waste waters, which comprises treating the waters at 70°–300° C, preferably 100°–160° C, with ammonia or compounds splitting off the same, and/or primary amines or compounds splitting off the amines, thereby obtaining insoluble reaction products which are mechanically separated from the waters.

5 Claims, No Drawings

PROCESS FOR ELIMINATING REACTIVE CHLORINATED ORGANIC COMPOUNDS FROM AQUEOUS SOLUTIONS

The invention relates to the elimination of reactive organic chlorinated compounds from aqueous solutions, particularly from waste waters.

As a rule, communal or industrial waste waters cannot be directly passed into a main canal, rivers, lakes, or the sea. They also cannot be pumped into the ground without damage to the above-mentioned bodies of waters, or without risk to the drinking water or the plant life.

Of the the most frequently practiced pre-treatments of such waste waters consists in a biological degradation of the organic components by means of bacteria. This can be done, in the so-called activated sludge processing plants, for example in a trickling filter, a disc-contactor, an aeration-basin, or by other known means. In rare cases, mushrooms or yeasts are used for biological degradation.

The undesirable substances of industrial waste waters, which contain so-called toxic ingredients not removable by biological degradation, are pre-treated by suitable chemical or physical methods, e.g., oxidation, cleavage, precipitation, filtration, or evaporation. They are either completely eliminated or changed to such an extent that they become accessible to biological degradation as a whole or in part.

It is desirable in that case, and partly decreed by the authorities, that the waste waters passed into the main canals do not exceed amounts of undesirable contents determined by regulations. The substances to be removed are characterized, in general, by "chemical oxygen demand" (COD) or "biological oxygen demand" (BOD). In order to obtain the required values of characterization, it is frequently advantageous to carry out the treatment of charged waste waters for removal of the charging substances in biological processing plants, if necessary, after suitable pre-treatment.

An example of waste waters which are not directly degradable by biological means, even though they contain substances which lend themselves to degradation, are waters containing chlorinated organic compounds. Such waste waters result, for example, by the oxidation of ethylene to acetaldehyde according to the "Wacker" process. There, olefins are oxidized with oxygen in the presence of platinum compounds and water, sometimes with co-catalysts such as iron or copper salts, forming aldehydes or ketones (see German Patents Dep No. 1,049,845, DEP No. 1,080,994, and following patents). The waste water mainly appears in the distillation column for the pure product. It contains substantially the already mentioned chlorinated aldehydes, chloracetic acid and acetic acid.

Besides some substances which are ready to be degraded, the mentioned waste waters contain a large amount of compounds which cannot be treated in a biological processing plant. One possibility of making these waste waters ready for biological degradation is to dilute the waste waters very considerably, say 1:20, to 1:100; in this manner, they may be made compatible with such processing plants. The above-mentioned method, however, is only desirable when a large biological sewage treatment plant is available in which the undegradable water can be admixed to other waste water so as to be adequately diluted. Another method would be to pre-treat the waste waters chemically in a way that would make them adapted for a biological sewage treatment plant. However, up to the present time, no useful methods have been found for that purpose.

It is another object of the present invention to provide a method by which waste waters containing aqueous solutions, particularly chlorinated organic compounds could be treated in a simple manner in order to decrease the content of chlorine in said chlorinated organic compounds to a large degree and, moreover, render an essential part of said organic compounds removable.

In accordance with the invention, the above object can be accomplished by treating the waters at 70°–300° C, preferably 100°–160° C, with ammonia or compounds splitting off ammonia, and/or by primary amines or compounds splitting off primary amines, and separating the difficulty soluble reaction products thereby obtained.

Surprisingly, it has been found that by the process according to the invention, the content of organically bound chlorine is almost entirely removed and that the content in organic substance is decisively reduced. By removing the organically bound chlorine, the water becomes completely ready for treatment in biological sewage processing plants and by the decrease in organic substances, the load for the sewage treatment plant becomes lower, and fewer undegradable or difficulty degradable substances reach the main canal. It is a further advantage that the nitrogen necessary for the sewage treatment plant is already fully or partly present in the waste water.

The insoluble compounds formed in the reaction have no tendency to adhere to surfaces, so that they will not lead to clogging of pipelines, coolers, measuring devices and so on. They also have satisfactory separation properties. Furthermore, the reaction with the ammonia or amine component can be so controlled that either correction, or only a slight correction of the pH value becomes necessary.

If the aqueous solutions contain only reactive chlorinated organic compounds, it is possible to accomplish an almost quantitative removal not only of the organically bound chlorine, but also of the organic substances. In industrial waste waters which conventionally obtained, e.g., in the above-mentioned Wacker process of oxidizing ethylene to produce acetaldehyde, there are other organic compounds present in addition to the chlorinated ones, and those cannot be eliminated by the process according to the invention. In such waste waters, decrease of the COD and BOD values by about 20–70% by weight can be achieved, depending on the reaction conditions and the composition of the waste waters.

The chemical course of the reaction is very complex and mostly unexplained. However, one can assume that aminolysis occurs by the action of ammonia or the amines, and subsequently oligo or polycondensations will follow.

By aqueous solutions capable of being processed, we may use all those which contain chlorinated organic compounds that react with ammonia or amines under the mentioned conditions. Preferably, mixtures of several chlorinated organic compounds are used, for example: chlorinated aldehydes, such as mono-, di-, or trichlor-acetaldehyde, α-chlorcrotonealdehyde, chlorocarboxylic acids, e.g., mono-, di, or trichloracetic acid, chlorobutyric acid, and chloramines as well as chlorinated hydrocarbons.

The chlorine content of the waste waters bound to organic compounds is usually 0.5–15% by weight, calculated on waste water. The COD values are, as a rule, in a range of 5–100 g $O_2$/liter. The waste waters resulting from industrial sources may also contain other organic compounds. However, usually this does not interfere with the process of the invention. On the other hand, there will be largely no decrease of such compounds by the process of the invention. As mentioned above, a particularly well degradable waste water is obtained by the Wacker process dealing with the oxidation of olefins to aldehydes and ketones.

It has also been mentioned that the reagents used for the organic chlorinated compounds are ammonia and compounds splitting off ammonia, as well as primary amines and compounds splitting off the latter. As compounds splitting off ammonia, the following are of technical interest: ammonium salts, e.g., the carbonate, chloride, sulfate and phosphate. These, or ammonia, are mostly added to the waste water in aqueous solution. However, ammonia can also be introduced as gas. Primary amines are mostly aliphatic, and have a chain length of 1–18 C-atoms. Examples are metyl-, ethyl-, propyl-, butyl-, and hexylamines. Di- and triamines may likewise be used. Compounds which split off amines are especially the hydrochlorides. The amine component may be added likewise in aqueous solution, or dissolved in other solvents (higher amines) or in substance.

In some cases, it is possible and advantageous to carry out the reaction with the aid of waste waters containing ammonia or amines.

Preferably, 0.3–5 mols of ammonia or compounds splitting off the same, and/or primary amines or compounds splitting off the latter are used per mol of organically bound chlorine. Especially useful is the addition of 1.5–3 mols.

The reaction is carried out in conventional reactors, autoclaves, vessels, reaction tubes or coils, at temperatures of 70°–300° C, and preferably at 100°–160° C and, as a rule, at pressures of 0–100 atm. excess pressure, preferably 0–10 atm. excess pressure. It may take place continuously or discontinuously. In general, continuous reaction with subsequent continuous mechanical removal of the resulting solid substances is preferred. The heat necessary for the reaction can be admitted by pre-heating the waste water if it is not already hot on arrival, or the waste water may be heated in the reactor, for example, by indirect heating as by a jacket or direct heating, e.g., by introduction of steam. By the latter method, stirring will result as well.

The addition of ammonia or the amine component may occur in the reactor, or mixing may be effected in a storage container without heating, and the reaction is brought about by heating in the reactor. It is essential to provide a thorough mixing. In most cases, a stirrer is therefore arranged in the reactor. Another means is the provision of a mixing device ahead of the reactor, where the ingredients are intensively mixed.

The time necessary for the reaction depends on many parameters, e.g., pressure, temperature, concentration of ammonia or amine, the contents of the waste waters and so on. In general, the reaction times are between 30 seconds and 5 hours, preferably between 5 and 60 minutes. After a short time, the waste water turns brown. A suspension of solid matter is formed consisting of non-adhesive particles, so that the transportation to the separating devices proceeds smoothly. Examples for separating methods are filtering, sedimentation, and centrifugation.

The pH value of the suspension after reaction is usually 3–10, mostly 5–8. It can be controlled and is controlled by ammonia or amine addition.

In some cases, it may be advantageous to add flocculating agents to the suspension formed by the reaction, e.g., aluminum and iron salts (1–1000 ppm/l) and flocculating adjuvants, e.g., polyelectrolytes (0.1–100 ppm/l.). In some cases, a still better separation of the reaction products is thereby achieved.

In the following, the process of the invention will be more fully described in a number of examples, but it should be understood that these are given by way of illustration and not of limitation.

EXAMPLE 1

A waste water obtained in the distillation column of the pure product, acetaldehyde, (produced by ethylene oxidation according to the Wacker-II-stage process) said waste water containing mono-, di-, and trichloracetaldehyde, α-chlorocrotonealdehyde, acetic acid, (about 15% by weight of the entire organic substance and chloracetic acid, about 45g/l (organic chlorine value 45g/l COD 35.2g/l), is treated in a reaction vessel at 100° C, while stirring, with 25% aqueous solution of ammonia in a molar ratio chlorine: ammonia = 1.2.5. After 2½ hours reaction time, the brown suspension which has formed, was filtered (pH = 7). The filtrate has now a COD of 19.6 g/l to a decrease of 44%. Organically bound chlorine could no longer be detected. The filtrate diluted 1:10 was introduced without further pre-treatment into an activated sludge processing plant without causing any damage.

EXAMPLE 2

A waste water obtained in the distillation column of pure acetaldehye, corresponding to Example 1, having a COD of 35.1 g/l and a content of 19.6 g/l or organically bound chlorine, is passed continuously into a reactor (steel tube) by means of a measuring pump of the piston type.

Through a second pump, so much 25% ammonia is added that the ratio organically bound chlorine : ammonia will be 1:2. The temperature is maintained at 130° C by directly blowing steam into the reaction chamber. The pressure is adjusted at 1.9 atm. excess pressure. The reaction time in the reactor is 1 hour. The product discharged continuously over a cooler has a pH of 6, the COD, after filtering off the resinous matter, is 21.5 g/l, corresponding to a decrease of 39%, only 1.5 g/l of organically bound chlorine is present in the solution.

EXAMPLE 3

Upon distillation for purification of crude acetaldehyde obtained by the Wacker-II-stage process, a concentrated side stream with 85.2 g/l organically bound chlorine and a COD of 145.6 g/l results, which is reacted in a stirring flask for 15 minutes at 100° C with ammonia in the molar ratio of organically bound chlorine : $NH_3$ = 1:2.

After removal of the brown bodies formed in the reaction, the solution has a pH of 8, the COD is 51.2 g/l, corresponding to a decrease of 65%; organically bound chlorine is still present in an amount of 3.7 g/l, corresponding to a decrease of 95.5%.

A reaction of 2 hours practically does not change the COD may more, whereas organically bound chlorine cannot be detected any longer by titration.

EXAMPLE 4

A diluted solution of the waste water stream used in Example 3 having a COD of 29.1 g/l and a content of organically bound chlorine of 17.0 g/l, is treated with diammonium phosphate, $(NH_4)_2HPO_4$ (ratio $Cl_2$ : $NH_3$ = 1:2) in a stirring flask at 100° C. The ratio is adjusted by appropriate amounts of di-ammonium phosphate added. After a reaction time of 3 hours, the solution is cooled and the precipitate is filtered off. In the remaining solution, there is no longer any organically bound chlorine detectable, and the drop in COD is 54%.

EXAMPLE 5

A waste water as in Example 3 having a COD 145.6 g/l and 85.2 g/l organically bound chlorine, is treated in a stirring flask with ethylamine for 3 hours at 100° C. The molar ratio of ethylamine: organically bound chlorine is 3:1. The gel-like reaction product is decanted and the solution then no longer contains any organically bound chlorine.

The COD of the waste water of 145.6 g/l before treatment, and the COD of the added ethylamine of 750 g/l (liters calculated on waste water solution) altogether 895.6 g/l has dropped to 166.5 g/l or 19% of the total COD.

EXAMPLE 6

A waste water from the distillation column for pure acetaldehyde obtained by the Wacker-II-stage process, from which a part of the chlorinated aldehydes has been withdrawn in a side stream during the distillation, is continuously admitted by means of a measuring pump of the piston-type at a temperature of 100° C into a reactor (steel tube). By means of a second pump, ammonia of 25% is added in such an amount that the ratio of organically bound chlorine : $NH_3$ = 1:1.75. By blowing in steam, the temperature in the reactor is maintained at 150° C and the pressure is 3.4 atm. excess pressure. The treated waste water having a starting COD of 18 g/l and a content of organically bound chlorine at 13.7 g/l is continuously withdrawn from the reactor over a cooler and filtered. The COD of the filtrate is 10.9 g/l corresponding to a drop of 40 %, and organically bound chlorine is no longer present.

What is claimed is:

1. A process for removing chlorinated organic compounds from waste waters containing from 0.5 to 15% by weight of organically bound chlorine, said chlorinated organic compounds being reactive at the specified reaction temperatures, the process comprising reacting the waste waters at temperatures from 70° to 300° C with a compound selected from the group consisting of ammonia, primary amines, compounds splitting off said ammonia and said primary amines at the reaction temperatures, and mixtures of said compounds, the molar ratio of organically bound chlorine and the selected reactant being 1 0.3 – 5 and the pH value of the solution after reaction being from 3 – 10, thereby obtaining isoluble reaction products which are separated from the reaction solution by one of the processes of filtration, sedimentation and centrifugation.

2. The process according to claim 1 wherein the temperatures of reaction are between 100° and 160° C.

3. The process according to claim 1 wherein the ratio between chlorine and the other reactant is 1:1.5 – 3.

4. The process according to claim 1 wherein the reaction is carried out continuously and the insoluble reaction products are removed from the solution by continuous mechanical separation.

5. The process according to claim 1 wherein optimum pH value is 5 – 8 and is controlled by the appropriate addition of the amine-containing component.

* * * * *